Patented June 1, 1937

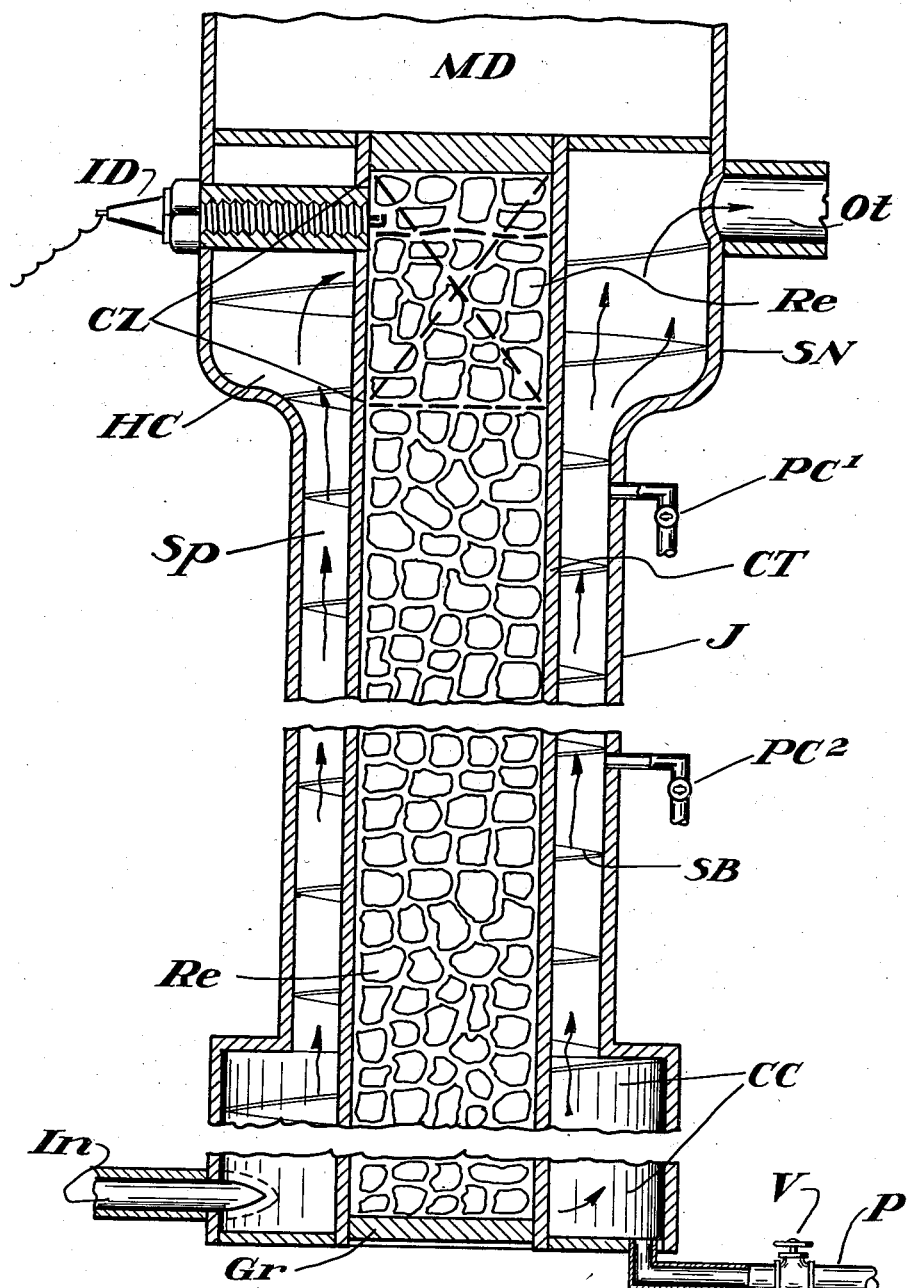
Fig-1-

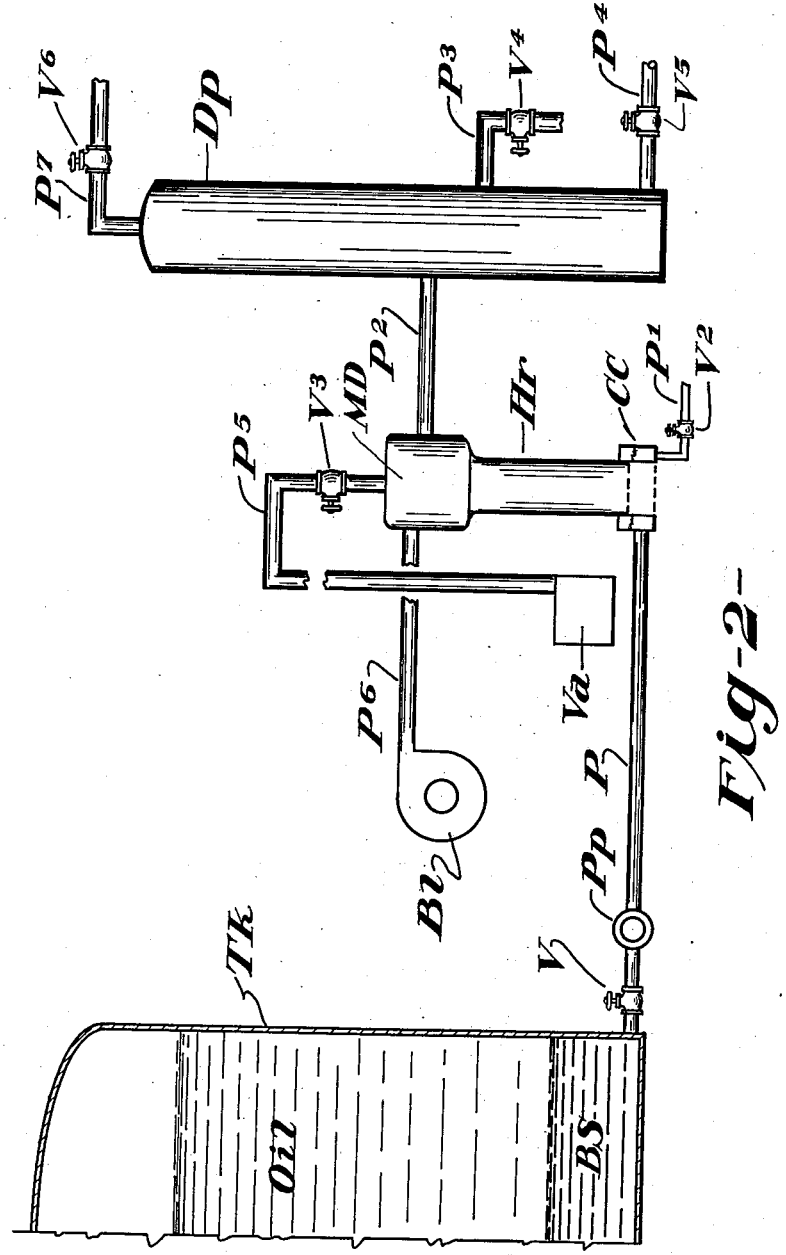

2,082,337

UNITED STATES PATENT OFFICE 2,082,337

HEATING APPARATUS FOR BREAKING DOWN EMULSIONS

Joseph W. Hays, Tulsa, Okla.

Application March 20, 1933, Serial No. 661,838

13 Claims. (Cl. 196—5)

My invention comprises a heater in which the fuel is burned by the "surface", or "catalytic", combustion process, in which process the combustion of a fluent mixture takes place in the interstitial spaces or "voids" of a bed or packing of refractory materials, or upon the surfaces of said materials, the heat produced by such combustion being of great intensity and being localized, as to its place of generation, by relatively narrow confines.

While my invention may be applied to a variety of uses, such as the heating of solutions of various kinds, it applies in a particular way to the heating of emulsions to produce demulsification, and the like. When an emulsion, such as one composed of oil and water, is heated too rapidly steam is produced and there is an enormous expansion in volume. Water is vaporized at temperatures far below those required to vaporize most oils and when steam is produced in an oil-water emulsion, as, for example, in a still, the oil remains in the liquid form and retains a great deal of its viscosity. The result is that an enormous volume of oily froth is discharged from the still and, in many cases, the entire still contents are lost. When a still acts in this manner it is known in refinery parlance as "puking".

Crude oil usually carries water in more or less quantity. This water slowly settles out of the oil when in storage and accumulates at the bottom of the storage tank, together with dirt and other foreign matter carried by the oil, and this is accompanied by more or less heavy asphaltic and paraffinic material. These accumulations in the bottoms of storage tanks are known among oil men as "B. S.", or, more euphemistically, as "basic sediment", or "bottom settlings". It is said that storage tank capacity in the Mid-Continent oil fields is, at the present time, impaired to the extent of more than a million barrels by the existing accumulations of such sediment or settlings. The problem in connection with the removal and disposal of these settlings is of such proportions that the refinery and pipe line companies are prone to defer doing anything about it until forced to act because of a diminishing storage capacity.

If given sufficient time, some of the water in the "B. S." will settle out and accumulate at the bottom of the tank and it is common practice to draw off this water from time to time. It is also the practice to stop draining when oil, in any quantity, appears with the water. When the above practice is continued over a period of time heavy sediment may accumulate in the bottom of the tank to a height of eight or ten feet. In order to remove this sediment it is usually necessary to cut out one or more of the tank sheets in the lower ring. Sometimes the sediment is so heavy that it has to be spaded out.

The treatment and disposal of basic sediment constitutes one of the numerous big problems of the oil industry, and it is always a pressing problem, not only on account of the waste of costly storage space, but because of the actual hazards due to the presence of water in the bottom of the tank. Storage tanks frequently take fire and when there are no means at hand for putting out the fire or removing the oil, the latter slowly heats from the top toward the bottom, eventually bringing the water in the bottom of the tank to the boiling point, whereupon the tank boils over, spreading the burning oil in all directions.

Various means of treating basic sediment for the recovery of oil have been in use for some time, some of these means including the use of chemicals. All of such means are expensive and unsatisfactory.

Many crude oils are produced in a state of emulsion and, sometimes, reach the pipe lines in a partial condition of emulsion. Such oils require treatment before they can be distilled and are, very frequently, extremely troublesome in refinery operation.

Crude oil is frequently produced together with a great deal of water, most of which will settle out in the field tank. Frequently the tank has to be steamed to remove the water before the pipe line company will run the oil. Sometimes the oil is actually produced as an emulsion. Sometimes storage tank roofs leak and water enters in rainy weather. Emulsions may be produced at almost any point in the field and between there and the final run-down tanks in the refinery. They are always troublesome but they can all be "broken" by means of heat, properly applied. Sometimes an emulsion can be completely broken and the water separated from the oil at temperatures no higher than 180 deg. F. Sometimes it is necessary actually to vaporize the water, which usually means the vaporization of some of the lighter oil fractions as well as the water. By means of my apparatus any sort of emulsion can be handled. If necessary the temperature of the liquid may be raised high enough to vaporize some of the heavier oil fractions as well as the lighter ones.

My present invention is illustrated in the accompanying drawings, in which—

Figure 1 shows the essential parts of my heating apparatus in cross-section, the heater being, preferably, in a vertical position.

Figure 2 is a diagrammatic drawing showing the connection between the heater and a dephlegmator tower in which the oil and water vapors are separated, together with the blower, which is used to supply the air required by the burner, and certain other essential units of a complete installation.

In my co-pending application for United States Patent, Serial Number 653,468, and in other pending applications, I have shown and claimed the details of a device for mixing gas, or vapor, with air in the desired proportions for a burner of the "catalytic" combustion type, such as I here employ, but as this, in my opinion, has nothing directly to do with the present invention, I am omitting the illustration of the mixing device, MD, in my drawing, Figure 1.

In Figure 1, CT is the combustion tube, which is packed with refractory materials, Re. The air-gas mixture produced in MD is ignited by the spark plug, ID, and burns without flame among the refractories, Re, the combustion being completed in the combustion zone, CZ. The waste gases from CZ pass through the remainder of the refractory material, Re, and escape through the openings in the grid, Gr. In this case the combustion operation takes place under a pressure somewhat in excess of that of the atmosphere, the pressure being produced, preferably, by a blower.

Surrounding the tube, CT, is a jacketing tube, J, the two tubes being separated, as shown, to provide the circulating space, $Sp$. $In$ is the inlet for the liquid which is to be heated and $Ot$ the outlet. $In$ is tangentially connected to CC, which is a circulation chamber at the lower end of $Sp$. HC is an enlargement of $Sp$ opposite the combustion zone, CZ, and may be formed by welding a swaged nipple, SN, to J. $PC^1$ and $PC^2$ are pet-cocks for drawing off samples. SB is a spiral baffle in CC, $Sp$ and HC.

In Figure 2, $Tk$ is a tank containing oil with a deposit of BS at the bottom. $Pp$ is a pump in the line, P, leading from the tank, $Tk$, to the circulating chamber, CC, of $Hr$. V is a valve in P between $Tk$ and $Pp$. $P^1$ is a draw-off pipe connected with CC, and $V^2$ is a valve in said pipe. $P^2$ is a pipe connecting the heater, $Hr$, with the dephlegmator, $Dp$. $P^3$ is a pipe for drawing off oil from $Dp$. $V^4$ is a valve in $P^3$. $P^4$ is a pipe for drawing off the water condensed in $Dp$. $V^5$ is a valve in $P^4$. $P^7$ is a pipe for drawing off vapors from $Dp$, and $V^6$ is a valve in said pipe. $P^5$ is a pipe carrying the fuel, which may be gas or oil vapor, to the mixer (MD, Figure 1), and $V^3$ is a control valve in this pipe. Should gas be unavailable, oil may be vaporized by heat in the vaporizer, $Va$, which may be of any approved type. The air required for combustion is furnished at the desired pressure by the blower, $Bl$, and delivered to MD through the pipe, $P^6$.

When the heater is in operation a very high temperature is produced in CZ, the heat being rendered almost entirely in the radiant form and being delivered very rapidly through the metal walls surrounding CZ. The gases leaving CZ are highly heated, but lose their heat very rapidly on passing through the refractories, Re, to make their final escape at Gr.

In breaking up some emulsions of oil and water it is essential that the liquid be raised gradually toward the boiling point and that sufficient heat be then administered to vaporize both the oil and the water. This is very satisfactorily accomplished by the means shown.

It will be seen that the velocity given the emulsion on its passage through $Sp$ may be sufficient to prevent the deposit, of any of the materials carried, upon the tube surfaces and that this velocity is quickly checked when the liquid enters HC, where it receives sufficient heat from CZ to vaporize the water carried by the emulsion, and, perhaps, also to vaporize some or all of the oil. It is plain that steam can be separated from liquid oil, or from oil vapor, or from both liquid oil and oil vapor, in the dephlegmator. It will also be seen that the proportions of the heater, as to length, and the relative proportions of $Sp$ and HC, as to liquid capacities, may be such that any regulation required to produce the necessary results may be attained merely by fixing the rate at which the emulsion is pumped through the heater, the pump, PP, which is preferably steam-driven, may be operated to force oil, or any other liquid, through the heater at any velocity required. About two-thirds of the total heat produced is delivered from CZ to the liquid in HC.

In the treatment of basic sediment considerable water may be found carrying very little oil. This water may be settled out in the circulating chamber, CC, from whence it may be drawn off by opening the valve, V, in the pipe, P. It will be seen that there will be some separation of oil and water in CC due to centrifugal action, as the stream from P enters CC angularly from one side.

The entire apparatus may be in portable form and carried upon a truck from place to place, as, for example, from one tank "farm" to another, or from tank to tank in a tank farm. It can be operated by one man.

Not more than a foot or two of basic sediment should ever be allowed to accumulate in a storage tank, and this might be found to consist very largely of water, not in a condition of emulsification.

It is of course understood that the source and nature of the emulsion to be treated has nothing to do with my invention. B. S. is frequently accumulated in ponds, where the water and heavier materials settle out and this simplifies the process of treating.

It will be seen that the apparatus described may have numerous uses, other than those mentioned and that many changes may be made in the details without departing from the spirit of my invention.

It will also be seen that my invention makes it possible to employ centrifugal force as a factor in breaking down an emulsion and in separating water, or any other heavy constituent of an emulsion. By means of the spirally disposed baffle, SB, the liquid on entering the chamber, CC, is given a gyratory motion which is continued until the broken-down emulsion, whether in the form of liquids or vapors, is discharged through the outlet, $Ot$. "B. S.", or basic sediment, may contain a great deal of free water and much of this will be thrown out by centrifugal force in CC from whence it may be drawn off through P. More water may be thrown out by centrifugal force while the liquid is whirled through $Sp$. Should the spiral baffle, SB, not be employed, the course of the liquid through the heater would be as indicated by the arrows in Figure 1.

I claim:

1. An apparatus for treating emulsions comprising an elongated vertically disposed combustion chamber in the upper end of which a high degree of heat is produced in the radiant form by combustion, means for producing such localized combustion and for causing the products thereof to flow downwards through said combustion chamber, together with means for forcing the emulsion to be treated in a continuous spiral course around said combustion chamber in contact with the wall thereof, said means comprising a shell of varying diameter coaxially disposed with the wall of said combustion chamber and a helical baffle between said shell and said wall.

2. An apparatus for dehydrating emulsions comprising an elongated vertically disposed combustion chamber, means for producing combustion in the upper part thereof and for forcing the products of combustion downwards through said combustion chamber, a chamber surrounding said combustion chamber through which the emulsion is circulated, means for forcing the emulsion to flow through said last mentioned chamber with constant change of direction to separate the water from the oil together with means for withdrawing the separated water from the lower part of said last-mentioned chamber.

3. An apparatus for the heat treating of emulsions comprising an elongated tubular furnace of relatively small diameter compared with its length, a shell surrounding said furnace coaxially disposed with respect to said furnace and of greater diameter than the latter, the diameter of said shell being greater near each end than in the main body thereof, together with means for producing heat in the radiant form by the flameless combustion of a fuel near one end of said furnace and for forcing the products of combustion through said furnace and means for forcing the emulsion to be treated through the annular space between said furnace and said surrounding shell.

4. An apparatus for the heat treating of emulsions comprising a tubular furnace of relatively small diameter compared with its length, a shell surrounding said furnace coaxially disposed with respect thereto and of greater diameter than said furnace, the diameter of said shell being greater near each end than in the main body thereof, a helically disposed baffle in the annular space between said shell and said furnace forming a continuous spiral conduit therebetween, together with means for producing heat by the flameless combustion of a fuel near one end of said furnace and for forcing the products of combustion through said furnace and means for forcing the emulsion to be treated through the annular space and said spiral conduit between said furnace and said surrounding shell.

5. An apparatus for treating liquids with heat which comprises a vertically arranged conduit helically disposed to form a continuous cylinder or tube, means for producing heat by combustion in said tube, near one end thereof and for forcing the products of combustion through said tube, together with means for forcing the liquid to be treated through said conduit.

6. An apparatus for dehydrating oil comprising a vertically disposed heating tube with means for producing a high degree of heat in the upper part thereof by the flameless combustion of a fuel, means for causing the products of combustion to flow downward through the said tube progressively losing temperature together with means for causing the oil to flow turbulently upwards over the heating surfaces of the said tube.

7. An apparatus for the heat-treating of liquids comprising a vertically disposed heating tube with means for producing a high degree of heat in the upper part thereof by the combustion of a fuel, means for causing the products of combustion to flow downward through the said tube while progressively giving up their heat together with means for causing the liquid to flow turbulently upwards over the heating surfaces of the said tube and with constant change of direction.

8. An apparatus for the heat treating of liquids comprising a four-walled helically disposed conduit forming with one of its walls a continuous cylinder or tube, an inlet for liquid near one end of said conduit and an outlet for liquid at the other, a packing of refractory material in said tube and means for causing a combustible mixture to burn in said tube adjacent to said liquid outlet and for causing the products of combustion to flow through said tube with diminishing velocity.

9. An apparatus for dehydrating emulsions comprising a vertically disposed cylindrical furnace with a jacketing member therearound and spaced apart from the wall of said furnace forming an annular space for liquid, closure plates between said jacketing member and the wall of said furnace near the extremities thereof, an inlet into said annular space near the bottom thereof and an outlet from said space near the upper part thereof, a packing of refractory materials in said furnace together with means for producing radiant heat in the upper part of said packing by the flameless combustion of a fuel therein.

10. An apparatus for dehydrating emulsions comprising a vertically disposed cylindrical furnace with a jacketing member therearound and spaced apart from the wall of said furnace forming an annular space for liquid, closure plates between said jacketing member and the wall of said furnace near the extremities thereof, a spirally disposed baffle in said annular space, an inlet for liquid into said annular space near the bottom thereof and an outlet near the top thereof, a packing of refractory materials in said furnace together with means for producing heat in the radiant form in the upper part of said packing by the flameless combustion of a fuel therein.

11. An apparatus for treating emulsions, comprising an elongated chamber, means for producing radiant heat by combustion in the upper part of said chamber, a surrounding chamber through which the emulsion to be treated is circulated, an inlet into said surrounding chamber at its lower end and an outlet from said chamber near its upper end.

12. An apparatus for treating emulsions, comprising in combination a heater and a dephlegmator, said heater comprising an elongated furnace chamber, disposed in a vertical position, means for producing heat in the radiant form in the upper part of said chamber by the flameless combustion of a fuel, a discharge opening in the lower part of said chamber for the products of combustion, a chamber surrounding said first mentioned chamber through which the emulsion to be treated is circulated in an upward direction and a pipe connection between the upper part of said chamber and said dephlegmator.

13. An apparatus for dehydrating emulsions comprising a vertically disposed cylindrical furnace with a jacketing member therearound and spaced apart from the wall of said furnace forming an annular space for liquid therebetween, an inlet into said annular space near the lower end thereof and an outlet near the upper end thereof and a packing of refractory materials in said furnace together with means for producing radiant heat in said furnace by the flameless combustion of a fuel amongst said refractory materials.

JOSEPH W. HAYS.